No. 645,701. Patented Mar. 20, 1900.
J. L. ANCELLE.
SPRING WHEEL FOR VEHICLES.
(Application filed Jan. 23, 1900.)
(No Model.)

Witnesses
H. H. Schott
M. C. Massie.

Inventor
Jean Louis Ancelle
by Chas. J. Hedrick
his Attorney

THE NORRIS PETERS CO., PHOTO-LITHO., WASHINGTON, D. C.

UNITED STATES PATENT OFFICE.

JEAN LOUIS ANCELLE, OF PERU, INDIANA.

SPRING-WHEEL FOR VEHICLES.

SPECIFICATION forming part of Letters Patent No. 645,701, dated March 20, 1900.

Application filed January 23, 1900. Serial No. 2,473. (No model.)

*To all whom it may concern:*

Be it known that I, JEAN LOUIS ANCELLE, a citizen of the United States, residing at Peru, in the county of Miami and State of Indiana, have invented certain new and useful Improvements in Spring-Wheels for Vehicles; and I do hereby declare the following to be a full, clear, and exact description of the invention.

This invention relates to wheels with a spring portion intermediate the hub and the rim. In my prior but concurrent applications, Serial No. 721,993, filed June 26, 1899, and Serial No. 731,453, filed November 24, 1899, I have described wheels of this kind in which the pressure (or, in other words, the weight on the axle) is conveyed to the same spring when it is above the axle in the same sense in which it is communicated thereto when it is below the axle.

The present invention has reference more particularly to spring-wheels of this description; but in part it includes improvements applicable to other forms of spring-wheels.

Figure 1:
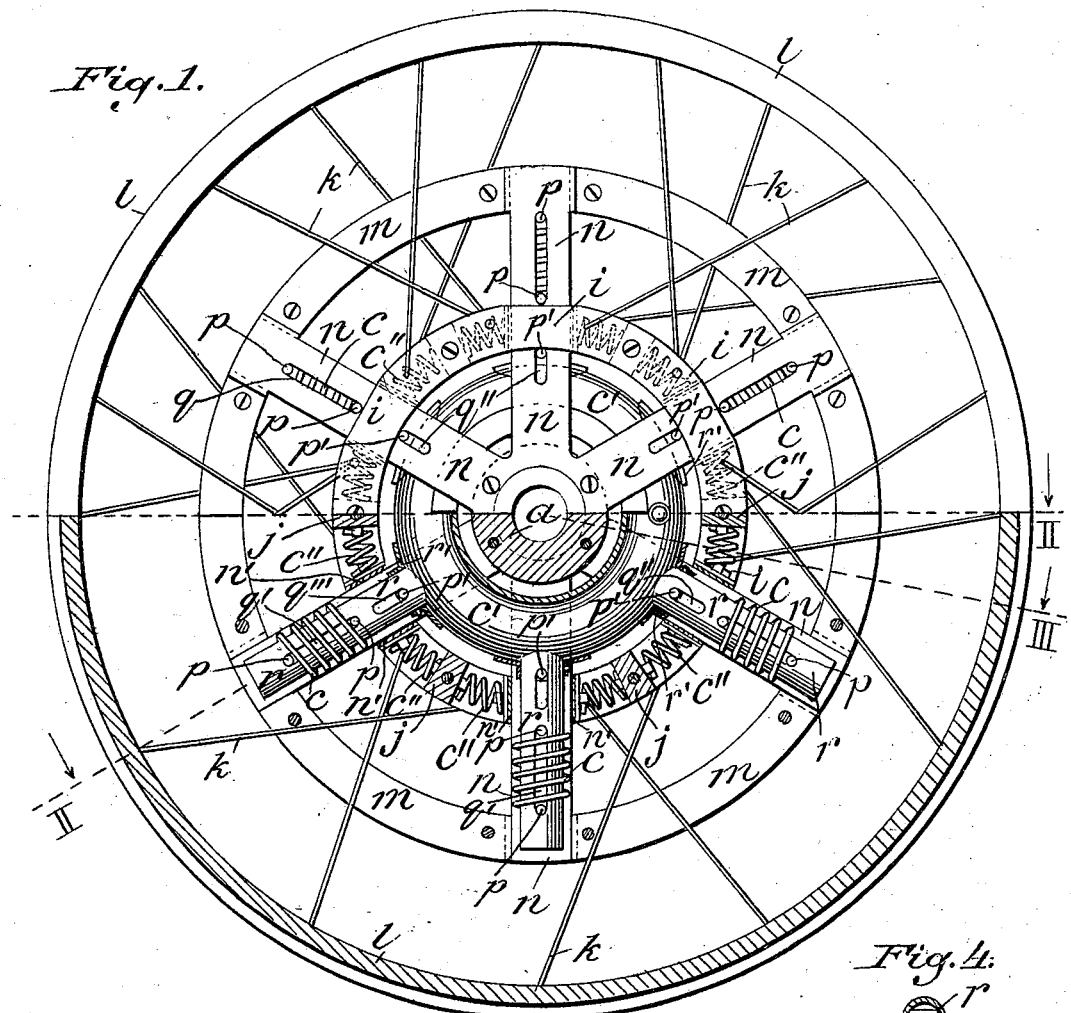
Figure 4:
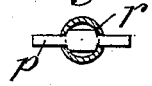
Figure 2:
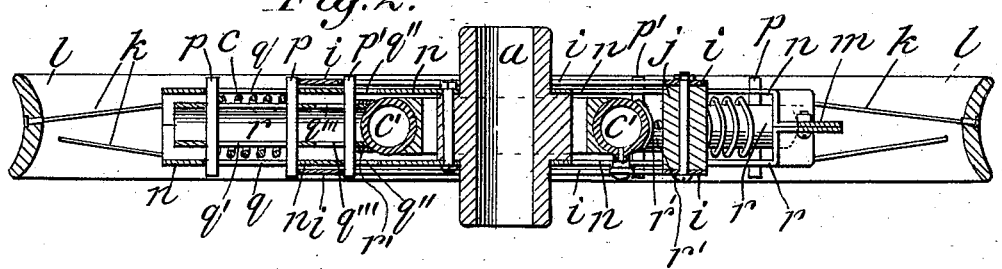
Figure 3:
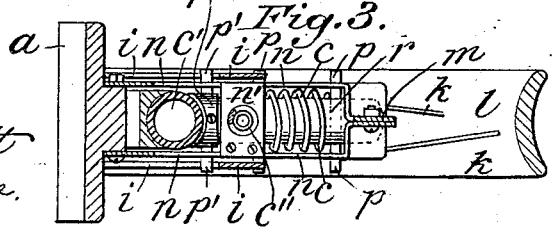

In the accompanying drawings, which form part of this specification, Figure 1 is a view, the upper half in elevation and the lower half in section, of a spring-wheel in accordance with the invention. Fig. 2 is a view in section on line II of Fig. 1 looking in the direction of the arrows. Fig. 3 is a half-section on line III of Fig. 1 looking in the direction of the arrow, and Fig. 4 is a detail view.

The hub $a$ (which is shown hollow and adapted for an ordinary journal, but which might be solid and which whether hollow or solid might be provided with ball or other bearings of any suitable description) is supported by springs $c\ c'\ c''$, which bear upon the ring $i$, connected by spokes $k$ with the rim $l$. Wire spokes are shown and a hollow rim of the kind used on bicycles in connection with a pneumatic tire, (not shown;) but the parts may be of any suitable construction. The rim portion of the wheel thus consists, as shown, of the rim $l$, spokes $k$, and inner ring $i$. This last is double, with blocks $j$ for spacing the parts and bolts for holding them together; but this is a detail which may be varied at will. There is a certain advantage in providing the ring $i$ with openings formed, as shown, between the blocks $j$ for receiving the springs $c''$; but such openings need not be provided if the consequent advantage should not be desired.

The hub $a$ is provided with projections $n$. As shown, these projections, together with a ring $m$, connecting the outer ends of the projections $n$, are formed of two plates bolted to the hub $a$ at the center and to each other at the periphery. (See Figs. 2 and 3, where the portions of the plates which form the ring $m$ are represented as bent toward each other and secured together by bolts.) The ring $m$ could be omitted and other modes of forming the hub projections could be used. The hub $a$, with its projections $n$ and ring $m$, constitutes the hub portion of the wheel, as shown.

In the different spring-wheels heretofore devised and in other relations springs have been employed of various materials (as pneumatic springs, rubber springs, or metal springs, for example) and of various forms, (as spiral compression-springs, spiral tension-springs, leaf-springs, tongue-springs, or torsional springs, for example.) In carrying the present invention into effect springs of any known or suitable material and form may be used; but only spiral compression-springs of metal (which are considered the best or at least as useful as any for a portion of the springs) and an elastic or pneumatic ring (which has special advantages when employed as hereinafter set forth, but which can be replaced by other springs if these special advantages should not be desired) will be illustrated and particularly described, those skilled in the art being able to substitute springs of other forms or material if they should desire to use them. Three sets of springs are shown. One set, $c$, composed, as shown, of separate springs, has butting or loose connections both on the rim side and the hub side with both the rim portion and the hub portion of the wheel. Each spring, as shown, surrounds a slide $r$ and is held between followers $p$ in the form of pins passing through slots $q\ q'$ in the corresponding projection $n$ and slide $r$, respectively.

The butting or loose connection on the rim side (outer end) of each spring $c$ is made, as shown, with the hub portion of the wheel by contact with the corresponding pin $p$ with the ends of the slots $q$ in the hub projection $n$ and with the rim portion of the wheel by contact of the same pin with the end of the slot $q'$ in the slide $r$, which is shown as connected with the inner rim-ring $i$ by means of the pin $p'$. Thus in the mid-position (shown) the pin $p$ at the outer end of a spring $c$ is in contact with the ends of both slots $q$ $q'$; but if the hub $a$ approach the rim $l$ in the line of a spring $c$ the said pin $p$ is held by the slide $r$, which is in turn held by the contact of pin $p'$ with ring $i$, the slots $q$ and $q''$ in the projection $n$ allowing this latter to travel toward the periphery of the wheel, whereas if the hub $a$ recede from the rim $l$ in the line of a spring $c$ the said pin $p$ is carried along by contact with the outer ends of the slots $q$ in the projection $n$. As shown, moreover, in the mid-position, the pin $p'$ not only makes contact with the ring $i$, but also with the outer ends of the slots $q''$ and the inner end of the slot $q'''$, so that when the hub $a$ recedes from the rim $l$ the slide $r$ also recedes therefrom, it being carried by the pin $p'$, which is at the outer ends of the slots $q''$ in the projection $n$ and the inner end of the slot $q'''$ in the slide $r$. If desired, therefore, the outer pin $p$ could be drawn inward through the slide $r$ even if it did not extend through the projections $n$, or if the slots $q$ were longer, the butting or loose connection of each spring $c$ on the rim side (outer end) thereof with the hub being made through said slide $r$ and pin $p'$. On the other hand, if the outer pin $p$ engage the slots $q$ the slide $r$ can be so connected with the ring $i$ as to follow its motions in both directions from the mid-position.

The butting or loose connection on the hub side (inner end) of each spring $c$ is made (as shown) with the hub portion of the wheel by contact of the corresponding pin $p$ with the ends of the slots $q$ in the projection $n$ and with the rim portion of the wheel by contact of the ring $i$ with the same pin $p$. Thus in the mid-position shown the said (inner) pin $p$ makes contact both with the inner ends of the slots $q$ and with the ring $i$; but if the hub $a$ approach the rim $l$ in the line of a spring $c$ the said pin $p$ is carried along by its contact with the inner ends of the slots $q$ and travels in the slot $q'$ of the slide $r$, which is held by the contact of the pin $p'$ with the ring $i$, whereas if the hub $a$ recede from the rim $l$ in the line of a spring $c$ the said pin $p$ is arrested by contact with the ring $i$, the slots $q$ and $q'$ allowing the movement of the projection $n$ and slide $r$, which latter is moved by the pin $p'$ making contact simultaneously with the outer ends of the slots $q''$ in the hub projection $n$ and with the inner end of the slot $q'''$ in slide $r$. When, therefore, a spring $c$ is below the wheel's axis, the pressure (or weight on the axle) is transmitted through the hub $a$ and its projection $n$ to the pin $p$ at the inner end of the spring $c$, so that said pin traveling in the slot $q'$ in the slide $r$ toward the wheel's periphery compresses the spring $c$ by forcing it against the pin $p$ at its outer end, from which latter pin the pressure is conveyed through the slide $r$ and pin $p'$ to the ring $i$, to be thence transmitted by the spokes $k$ to the rim $l$, resting on the ground. The slots $q$ in the projection $n$ permit this latter to move toward the rim $l$. When the same spring $c$ is brought by the revolution of the wheel above the latter's axis, the pressure from the hub $a$ and its projection $n$ is transmitted to the pin $p$ at the outer end of said spring either directly from the said projection or indirectly therefrom through the pin $p'$ and slide $r$, so that said pin $p$ traveling with the projections $n$ away from the rim $l$ compresses the spring $c$ by forcing it against the pin $p$ at its inner end, from which latter pin the pressure is conveyed to the ring $i$, to be thence transmitted through the spokes $k$ to the rim $l$, and so to the ground. The slots $q$ and $q'$ allow the projection $n$ and slide $r$ to travel away from the rim $l$. Another set of the springs is formed, as shown, of an elastic or pneumatic ring $c'$, which is considered more advantageous than a number of separate springs, which might be used. This ring $c'$ is shown as an annular tube provided with a stem and valve for inflating the same with air or other fluid under pressure after the manner of an ordinary pneumatic tire or cushion. It could, however, be made of solid elastic material or of hollow elastic material without air or other fluid under pressure therein. Followers formed, as shown, by the slides $r$ bear upon the ring $c'$ and are provided on the rim side (part between the elastic or pneumatic ring $c'$ and the wheel's periphery) with butting or loose connections with both the rim portion and the hub portion of the wheel.

The butting or loose connection with the rim portion of the wheel is formed by the pin $p'$, which bears against the ring $i$, and that with the hub portion thereof by the same pin $p'$ bearing against the outer ends of the slots $q''$ in the corresponding projection $n$. Thus in the mid-position shown the pin $p'$ makes contact both with the outer ends of the slots $q''$ and with the ring $i$; but if the hub $a$ approach the rim $l$ in the line of a follower (slide $r$) the said pin $p'$ is held from a corresponding motion by its contact with the ring $i$, while the slots $q''$ allow the projection $n$ to move in this (rimward) direction independently of said pin $p'$, whereas if the hub $a$ recede from the rim $l$ in the line of a follower the pin $p'$ and the follower are drawn away also, the abutting contact of the said pin $p'$ with the inner ring $i$ of the rim portion of the wheel not interfering with the motion of the pin $p'$ toward the wheel's axis.

The elastic or pneumatic ring $c'$ could be mounted upon the hub $a$, in which case the said ring would of course move with the projections $n$, so that a follower $r$ when it should be below the wheel's axis would convey pressure to said ring $c'$, but when it should be above the wheel's axis would resist the expansion of the ring at the corresponding point, but would not convey pressure thereto. As shown, however, the ring $c'$ is floating—that is to say, is left free to move independently of the hub—being mounted, as shown, on a ring which surrounds the hub, leaving between them an annular free space, at least when the parts are in the mid-position. With a floating ring a follower when it is above the wheel's axis is pressed by the contact of pin $p'$ against the outer end of slots $q''$ against the ring $c$, through which the pressure is transmitted to the follower on the opposite side of the wheel's axis to be transmitted from said follower through its pin $p'$ to the ring $i$, and so through the spokes $k$ and rim $l$ to the ground.

As shown, each slide $r$ forms both a follower to press against the elastic or pneumatic ring $c'$ and a means of connecting the pin $p$ at the outer end of a spring $c$ with the ring $i$, (by the aid of the pin $p'$.) The said means may therefore be regarded as constituting an extension of the said follower. This construction, while desirable and the subject of special claim, can be omitted, if desired. The followers for the elastic or pneumatic ring $i$ could be made separate from the outer parts of the slides $r$, which serve to complete the connections for the springs $c$—as, for example, by connecting the outer parts of said slides by a pin with the ring $i$ and dispensing with the slots $q'''$ in the followers.

The springs $c''$ are arranged peripherically, or, in other words, with their axes transverse to radii of the wheel and in the plane of the latter, and have connections with the hub portion and the rim portion of the wheel. As shown, they are interposed in the openings in the ring $i$, between the block $j$ of said ring and cross-pieces $n'$ of the projections $n$. Each cross-piece may be formed integral with one part of each projection $n$ and be fastened by screws to the other parts thereof, as shown in Fig. 3. The springs $c''$ assist in supporting the pressure (or weight on the axle) and also in maintaining the projections $n$ midway, or nearly so, between the blocks $j$.

The pins $p$ $p'$ can be made in any suitable way, and the slides $r$ may be solid or hollow and of any desired shape in cross-section.

In Fig. 4 is shown a tubular slide of circular cross-section and a pin $p$, provided in the middle with an enlargement which prevents its withdrawal. The enlargement is flat and can be introduced through the slot $q''$.

It is possible to use any one of the three sets of springs with or without either or both of the others and with or without modification in the set or in one or more of the sets employed. When all these are present, as shown, each set takes a part of the weight, those of the set $c$ being in compression both above and below the wheel's axis, and the elastic or pneumatic floating ring $c'$ being compressed both above and below said axis.

The followers $r$ are shown provided with shoes $r'$, resting upon the elastic or pneumatic ring $c'$ and secured adjustably to the followers, so that the pressure borne jointly by the springs $c$ and $c'$ can be distributed between them. A distribution of pressure could also be effected between the two sets of springs if other forms of springs were used in the place of the elastic or pneumatic ring $c'$. The adjustable shoes are also advantageous even independently.

I claim as my invention or discovery—

1. A wheel composed of a rim portion, a hub portion provided with projections, an elastic or pneumatic ring surrounding the wheel's axis and having butting or loose connections on the rim side thereof with both the said rim and the said hub portions, and an exterior circle of separate springs having connections with said rim and hub portions, substantially as described.

2. A wheel composed of a rim portion, a hub portion provided with projections, an elastic or pneumatic ring surrounding the wheel's axis and having connections with the said rim and hub portions, and an exterior circle of separate springs having butting or loose connections at each end with both the said rim and the said hub portions, substantially as described.

3. A wheel composed of a rim portion, a hub portion provided with projections, an elastic or pneumatic ring surrounding the wheel's axis and having butting or loose connections on the rim side thereof with both the said rim and the said hub portions, and an exterior circle of separate springs having butting or loose connections at each end with both the said rim and the said hub portions, substantially as described.

4. A wheel composed of a rim portion, a hub portion provided with projections, an elastic or pneumatic floating ring surrounding the wheel's axis and having butting or loose connections on the rim side thereof with both the said rim and the said hub portions, and an exterior circle of separate springs having connections with said rim and hub portions, substantially as described.

5. A wheel composed of a rim portion, a hub portion, and an elastic or pneumatic floating ring surrounding the wheel's axis and having butting or loose connections on the rim side thereof with both the said rim and the said hub portions, substantially as described.

6. A wheel composed of a rim portion, a hub portion, a set of springs provided with butting or loose connections both on the rim side and the hub side thereof with both the said rim and the said hub portions, and another set, which is preferably in the form of an elastic or pneumatic ring, floating and being provided on the rim side thereof with butting or loose connections with both the said rim and the said hub portions, substantially as described.

7. A wheel composed of a rim portion, a hub portion provided with projections, a set of springs provided with butting or loose connections both on the rim side and the hub side thereof with both the said rim and the said hub portions, another set, which is preferably in the form of an elastic or pneumatic ring, floating and being provided on the rim side thereof with butting or loose connections with both the said rim and the said hub portions, and a third set peripherically arranged and having connections with said rim and hub portions, substantially as described.

8. A wheel composed of a rim portion, a hub portion provided with projections, a set of springs, which is preferably in the form of an elastic or pneumatic ring, floating and provided on the rim side thereof with butting or loose connections with both the said rim and the said hub portions, and another set peripherically arranged and having connections with said rim and hub portions, substantially as described.

9. A wheel composed of a rim portion, a hub portion provided with projections, an elastic or pneumatic ring surrounding the wheel's axis and having loose or butting connections on the rim side thereof with both the said rim and the said hub portions, and a set of springs peripherically arranged and having connections with said rim and hub portions, substantially as described.

10. A wheel composed of a rim portion, a hub portion provided with projections, an elastic or pneumatic ring surrounding the wheel's axis and having loose or butting connections on the rim side thereof with both the said rim and the said hub portions, an exterior circle of separate springs having connections with said rim and hub portions, and a set of peripherically-arranged springs also having connections with said rim and hub portions, substantially as described.

11. A wheel composed of a rim portion, a hub portion, and three sets of springs interposed between the said rim and hub portions, one of said sets being arranged peripherically and another being preferably in the form of an elastic or pneumatic ring, substantially as described.

12. A wheel composed of a rim portion having an inner ring, a hub portion provided with projections extending beyond said inner ring, a circle of springs arranged outside of said inner ring and provided with slot-and-pin connections with both the said inner ring and the said hub projections, and an elastic or pneumatic ring arranged between said inner ring and the wheel's axis and provided with means for transmitting its pressure to said inner ring, substantially as described.

13. A wheel composed of a rim portion having an inner ring, a hub portion provided with projections, an elastic or pneumatic ring, and followers resting against said elastic or pneumatic ring and having loose or butting connections with both said inner ring and said projections, substantially as described.

14. A wheel composed of a rim portion having an inner ring, a hub portion provided with projections, an elastic or pneumatic ring, a circle of springs exterior to said elastic or pneumatic ring, followers resting against said elastic or pneumatic ring and having loose or butting connections with both said inner ring and said projections, and means for establishing butting or loose connections at each end of said exterior springs with both the said inner ring and the said projections, substantially as described.

15. A wheel composed of a rim portion having an inner ring, a hub portion provided with projections, an elastic or pneumatic ring, a circle of springs exterior to said elastic or pneumatic ring, followers resting against said elastic or pneumatic ring and provided with butting or loose connections with both said inner ring and said projections, and means composed in part of extensions of said followers for establishing butting or loose connections at each end of said exterior springs with both the said inner ring and the said projections, substantially as described.

16. A wheel composed of a rim portion having an inner ring provided with openings therein, a hub portion provided with projections, and springs peripherically arranged in said openings and interposed between said ring and said projections, substantially as described.

17. A wheel composed of a rim portion having an inner ring provided with openings therein, a hub portion provided with projections, springs peripherically arranged in said openings and interposed between said ring and said projections, and either or both of the following, that is to say, a circle of separate springs having butting or loose connections both on the rim side and the hub side thereof with both the said inner ring and the said projections, and an elastic or pneumatic ring having butting or loose connections on the rim side thereof with both the said inner ring and the said projections, substantially as described.

18. A wheel composed of a rim portion having an inner ring, a hub portion provided with projections, springs having butting or loose connections both on the rim side and the hub side with both said projections and said inner ring, and an elastic or pneumatic ring between said inner ring and said hub, substantially as described.

19. A wheel composed of a rim portion, a hub portion, an elastic or pneumatic ring, a circle of springs outside of said ring, followers intermediate the rim portion and said ring, and connections formed in part by extensions of said followers for communicating the pressure of said springs to the said rim and hub portions, substantially as described.

20. A wheel composed of a rim portion provided with an inner circle, a hub portion, a set of springs arranged outside of said circle between the said hub and rim portions, a second set of springs formed most advantageously of an elastic or pneumatic ring and arranged inside of said circle between said hub and rim portions, and followers provided with adjustable shoes for bearing upon the said second set of springs, substantially as described.

21. A wheel composed of a rim portion, a hub portion, an elastic or pneumatic ring interposed between the said hub and rim portions, and followers provided with adjustable shoes bearing upon said ring, substantially as described.

In testimony whereof I affix my signature in presence of two witnesses.

JEAN LOUIS ANCELLE.

Witnesses:
  A. GEHRING,
  MICH. KANTZER.